(No Model.)

W. M. DOUGLAS.
JETTY.

No. 401,695. Patented Apr. 16, 1889.

Witnesses,
M. P. McKee
L. M. Bartlett
F. S. Perrie

Inventor,
William M. Douglas
by F. B. Brock
Attorney

UNITED STATES PATENT OFFICE.

WILLIAM M. DOUGLAS, OF GALVESTON, TEXAS, ASSIGNOR OF ONE-THIRD TO CHARLES L. BENEKE, OF SAME PLACE.

JETTY.

SPECIFICATION forming part of Letters Patent No. 401,695, dated April 16, 1889.

Application filed May 3, 1888. Serial No. 272,647. (No model.)

*To all whom it may concern:*

Be it known that I, WILLIAM M. DOUGLAS, a citizen of the United States, residing at Galveston, in the county of Galveston and State of Texas, have invented certain new and useful Improvements in Jetties; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to breakwaters, jetties, and the like.

The object of my improvements is to provide structures which may serve as jetties, dams, bulk-heaks, breakwaters, canals, banks, levees, cribbing, devices for protecting shores, and other similar work.

In the construction of such work my invention consists, mainly, in the utilization of a central or interior core of clay, or clayey substance, about which is formed a retaining-envelope in connection with suitable substructures, coping, walls, and tracks.

I will proceed to describe my invention as applied to the construction of jetty-work.

The drawings illustrate in cross or transverse section a jetty, showing its interior construction.

Figure 1:
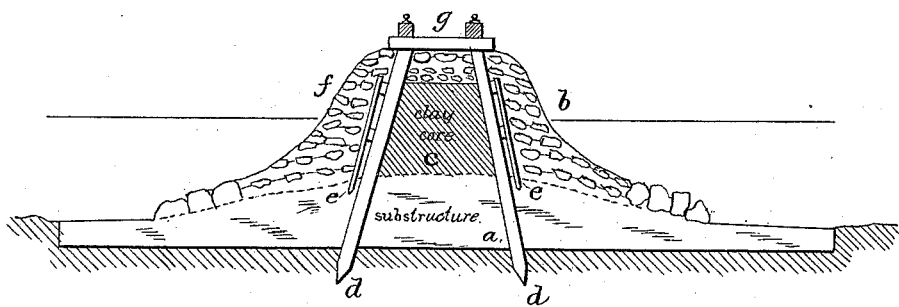
Figure 2:
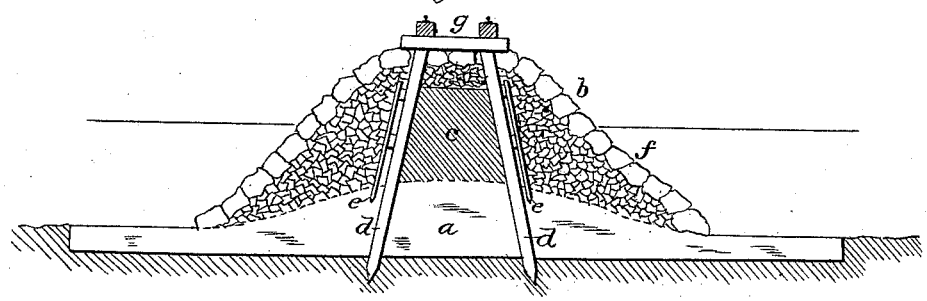

Figure 1 is a cross-section of a jetty or other similar structure, and Fig. 2 is a modification thereof.

*a* represents the substructure. I prefer to construct it of one or more courses of brush mattresses having an overlying coating of clay and rock-ballast.

*b* represents the superstructure.

*c* is the core of clay.

*d d* represent piles, and *e e* are pile sheeting or planking secured to the piles.

*f* represents a protective wall or outer envelope.

The clay or clayey core *c* may be filled in in bulk, or it may be confined in sacks or bags, as an additional protection against wash or undermining. The outer covering, *f*, may be of stone or of concrete, or a combination of those materials, or any substance suitable for the purpose may be employed. I may use clay also in connection with riprap or block stone or concrete. The substructure *a*, also, may be simply of riprap stone or of other suitable material.

The planking upon the piles may be dispensed with. Where the piles are employed I generally prefer to lay a tramway, *g*, supported thereby. The tramway may, however, be laid along the jetty if piles are not used.

In jetty constructions I prefer to use clay not only for the core or incasement, but as a protective coating for the brush-work when such is used, and also as a plastic material to fill the interstices in the riprap or other stone-work.

Any given or desired practicable shape may be employed in carrying out my improved jetty or like constructions.

I have found that clay used in jetty or similar work in the manner above described is attended by very efficient results as regards stability, impermeability, and cheapness, all of which are items of the utmost importance in works of this character.

I claim—

The combination, in a jetty or similar structure, of a core or hearting of clay, piling along the sides of the core, and a stone envelope upon the sides of the core, substantially as set forth.

In testimony whereof I affix my signature in presence of two witnesses.

WILLIAM M. DOUGLAS.

Witnesses;
G. W. HOASE, Jr.,
CHAS. L. BENEKE.